United States Patent
Abels et al.

(10) Patent No.: US 7,125,513 B2
(45) Date of Patent: Oct. 24, 2006

(54) METHOD AND DEVICE FOR CONTROLLING THE SHRINK BEHAVIOR OF PLASTIC MATERIALS DURING PRIMARY SHAPING

(75) Inventors: Olaf Abels, Belm (DE); Martin Rechtien, Neuenkirchen-Vörden (DE)

(73) Assignee: ZF Lemforder Metallwaren AG (DE)

( * ) Notice: Subject to any disclaimer, the term of this patent is extended or adjusted under 35 U.S.C. 154(b) by 212 days.

(21) Appl. No.: 10/476,290

(22) PCT Filed: Jan. 16, 2003

(86) PCT No.: PCT/DE03/00104
§ 371 (c)(1),
(2), (4) Date: Oct. 27, 2003

(87) PCT Pub. No.: WO03/059597
PCT Pub. Date: Jul. 24, 2003

(65) Prior Publication Data
US 2004/0130070 A1    Jul. 8, 2004

(30) Foreign Application Priority Data
Jan. 17, 2002   (DE) ................................ 102 01 796

(51) Int. Cl.
*B29C 45/14* (2006.01)
*F16B 21/00* (2006.01)
(52) U.S. Cl. ................ 264/342 R; 264/341; 264/259; 264/274; 264/328.1; 425/542; 403/122; 403/132; 403/135
(58) Field of Classification Search ................ 264/342
See application file for complete search history.

(56) References Cited

U.S. PATENT DOCUMENTS

| 4,290,181 A | 9/1981 | Jackson |
| 4,908,216 A | 3/1990 | Düllings et al. |
| 5,243,874 A | 9/1993 | Wolfe et al. |
| 5,634,726 A | 6/1997 | Edele et al. |
| 6,152,641 A | 11/2000 | Rabe |
| 2001/0009308 A1 | 7/2001 | Kinpara et al. |

FOREIGN PATENT DOCUMENTS

| DE | 36 22 540 | 1/1988 |
| DE | 42 29 495 | 11/1993 |
| DE | 296 17 276 | 3/1998 |
| DE | 198 32 254 | 1/2000 |
| DE | 199 29 182 | 1/2000 |
| EP | 0 541 488 | 5/1993 |
| GB | 2 282 858 | 4/1995 |
| JP | 58106216 | 6/1983 |

*Primary Examiner*—Christina Johnson
*Assistant Examiner*—Monica A. Huson
(74) *Attorney, Agent, or Firm*—McGlew & Tuttle, PC

(57) ABSTRACT

A process for controlling the shrinkage behavior during the original shaping of plastics during the manufacture of a plastic shell, especially a bearing shell for a ball-and-socket joint, wherein liquefied plastic is introduced between an inner mold (3) and an outer mold (2) in order to be cured therein, wherein the plastic is partially fixed on the outer mold (2) during the curing. This process can be preferably used in a device for controlling the shrinkage behavior during the original shaping of plastics, which has a casting mold, which accommodates at least one outer mold (2) and an inner mold (3) inserted into same, wherein the liquefied plastic (1) to be molded can be introduced between the mold parts (2, 3), wherein means for fixing the liquid plastic (1) are formed on the outer mold (2).

20 Claims, 4 Drawing Sheets

Fig. 2  After the solidification of the shell

Detail X

METHOD AND DEVICE FOR CONTROLLING THE SHRINK BEHAVIOR OF PLASTIC MATERIALS DURING PRIMARY SHAPING

FIELD OF THE INVENTION

The present invention pertains to a process and a device for controlling the shrinkage behavior during the original shaping of plastics.

BACKGROUND OF THE INVENTION

Such processes and devices are usually used in manufacturing plants manufacturing vendor parts for automobiles, e.g., in the manufacture of ball-and-socket joints. Ball-and-socket joints, as they are used, e.g., for mounting suspension arms in vehicles, have at least one ball-and-socket joint housing, which accommodates a bearing shell, which consists of at least one part and in which a ball pivot is mounted rotatably and tiltably. The ball pivot must be accommodated in the housing or in the bearing shell such that no movement shall be possible in the axial direction of the ball pivot. This is achieved in practice by an oversize of the joint ball diameter compared with the ball pivot opening of the ball-and-socket joint housing.

Utility Model No. DE 296 17 276 U1 (see also U.S. Pat. No. 6,152,641) discloses a ball-and-socket joint which has a housing, which is provided with a cavity and in which a ball is mounted movably in a bearing shell. The bearing shell is made of plastic, which is injected into the ball housing through an opening extending to the cavity.

The drawback encountered in the prior-art process is that the injected plastic and the ball are connected to one another in a nonpositive manner due to shrinkage via a press/shrink fit, so that the freedom of movement of the ball pivot and of the ball in relation to the sliding shell and the housing is compromised and leads to excessively high moments of friction. In addition, it is difficult to introduce lubricants into the mount due to the uncontrolled shrinking-on. Furthermore, an undesired gap is formed against the housing on the outside of the shell material due to the shrinkage. Solutions in which the shrinkage behavior shall be controlled by the addition of fibers or by heat treatment show no success.

SUMMARY OF THE INVENTION

The object of the present invention is therefore to provide a process as well as a device for the controlled shrinkage of a liquefied, curing plastic, which shrinkage can be affected, so that the cavities formed are predictable and usable.

According to the invention, a process is provided for controlling shrinkage behavior during n original shaping of plastics during the manufacture of a plastic shell, particularly a bearing shell for a ball-and-socket joint. The liquid material is partially fixed on a part of the mold during its transition from the liquid into the solid state of aggregation. Liquefied plastic can be introduced for curing between an inner mold and an outer mold.

This solution offers the advantage that a specific benefit of the cavities inevitably formed by the shrinkage is achieved due to the controlled shrinkage, namely, in order to reduce the friction and consequently the wear between the individual parts, on the one hand, and to introduce, e.g., lubricants into the cavities, on the other hand.

A special advantage is that the material is fixed only partially on the outer mold. Better mobility of the inner mold is guaranteed as a result. The process can thus be used especially well for connecting a ball pivot with a ball-and-socket joint housing and a bearing shell of a ball-and-socket joint, which bearing shell is arranged between these.

The only partial fixation of the curing plastic can be achieved based on the physical or chemical properties of defined areas of the outer mold, i.e., a positive-locking or nonpositive connection with the outer mold is produced or brought about only partially, and a controlled shrinkage of the plastic is made possible as a result of this.

Another embodiment of this process can be seen in that the intermediate space between the inner mold and the outer mold is filled by means of an injection molding process. This process is especially suitable for casting plastics, which are the preferred material for manufacturing bearing shells. As a result, very good homogeneity of the material can be achieved, and short cycle times are possible, so that the manufacturing time is decisively reduced for an assembly unit manufactured by means of the process according to the present invention compared with prior-art processes.

As an alternative, the fixation may be advantageously achieved by means of a connection in substance or positive-locking connection, as a result of which the possibilities of fixation are made flexible and a limitation to one process can be avoided in achieving the fixation.

In the case of a connection in substance, it would be possible, e.g., to think of bonding, because this does not require a time-consuming shaping, so that fixation can be achieved in a simple manner.

In addition, as was intimated in the introduction, it is advantageous to utilize the cavities formed during the solidification of the material such that lubricants are introduced into these cavities after the solidification.

It is particularly advantageous for cost reasons to carry out the above-described process with a device for controlling the shrinkage behavior during the original shaping of plastics. This device may have a casting mold, which accommodates at least one outer mold and one inner mold inserted into same, where the liquified plastic to be molded can be introduced between the mold parts. Means for fixing the liquid plastic are formed on the outer mold in a solution according to the present invention.

Another advantage is that the means for fixing the plastic are profiles, which may be designed, e.g., as T-grooves, into which the liquid material to be molded flows. Reliable fixation as well as good control of the shrinkage behavior are now achieved due to the solidification transition with a simple and inexpensive molding around the inner mold part.

However, the means for fixing the plastic may also be mold zones which partially have a primer with high adhesiveness for the plastic to be molded as well as areas free from primer, which have a low adhesiveness for the plastic to be molded.

Furthermore, mold zones which partially have a binder such as an adhesive as well as binder-free areas are suitable for use as means for fixing the plastic.

It is especially advantageous for the inner mold to be the ball of a ball pivot, because the material is thus directly coordinated with the component intended for the intended use and via a separate mold part as well as the assembly of the molded part with the ball pivot can be eliminated.

An optimal force and stress distribution can thus be achieved according to the present invention within the plastic material. Moreover, the number of cavities for the lubrication can be optimized. Furthermore, it is possible to control the shrinkage behavior of the solidifying plastic in a specific manner.

According to another aspect of the invention a ball a ball-and-socket joint is formed by a process including providing a ball-and-socket joint housing, providing a ball pivot, introducing liquified plastic between an inner mold and an outer mold and at least partially fixing the plastic on said outer mold during curing of the plastic to form a bearing shell. The bearing shell is disposed between said ball-and-socket joint housing and said ball pivot. The ball pivot may be used as the inner mold. The ball a ball-and-socket joint housing may be the outer mold.

Preferred exemplary embodiments of the present invention will be described in greater detail below on the basis of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
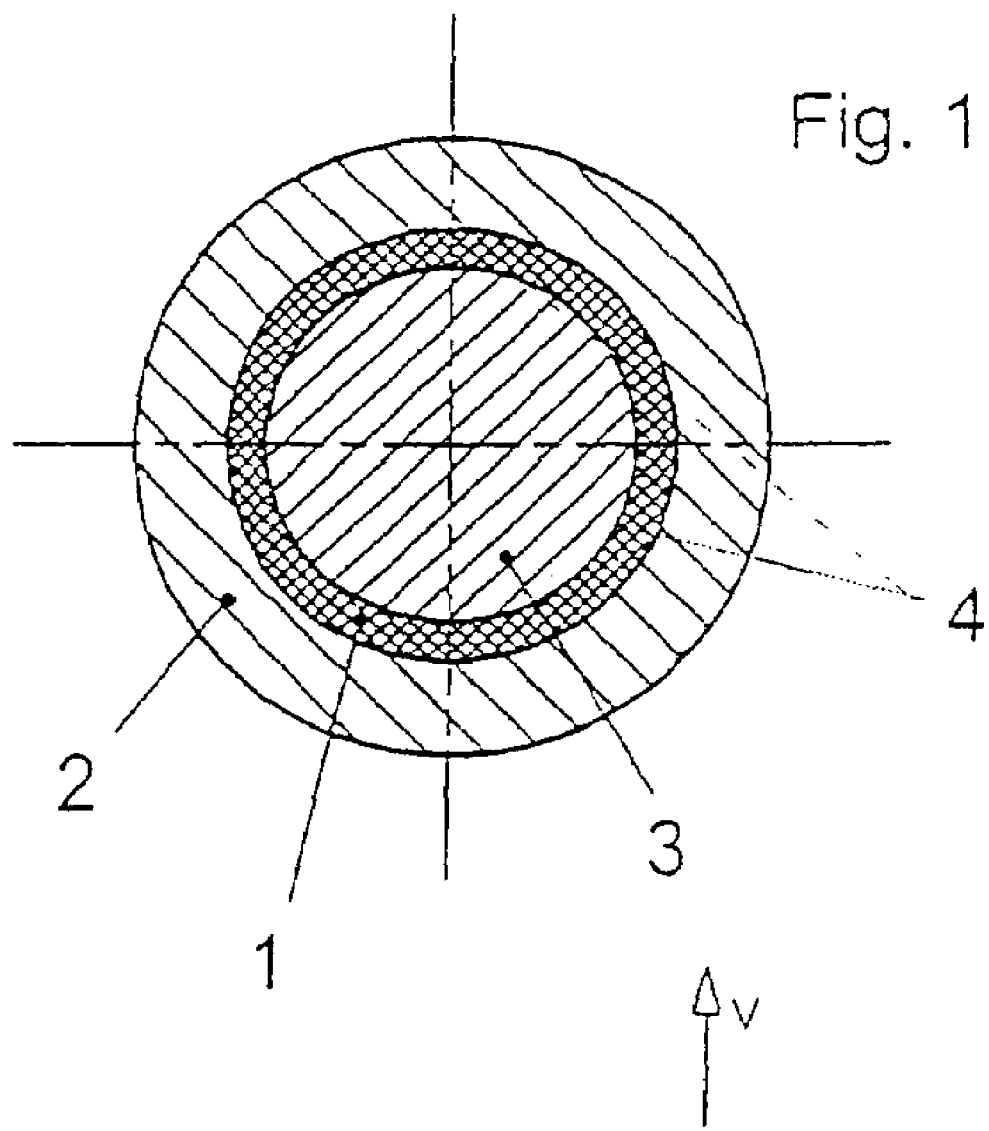
FIG. 1 is a schematic sectional view of a snapshot of a process forming a ball-and-socket joint according to the invention.
Figure 2:
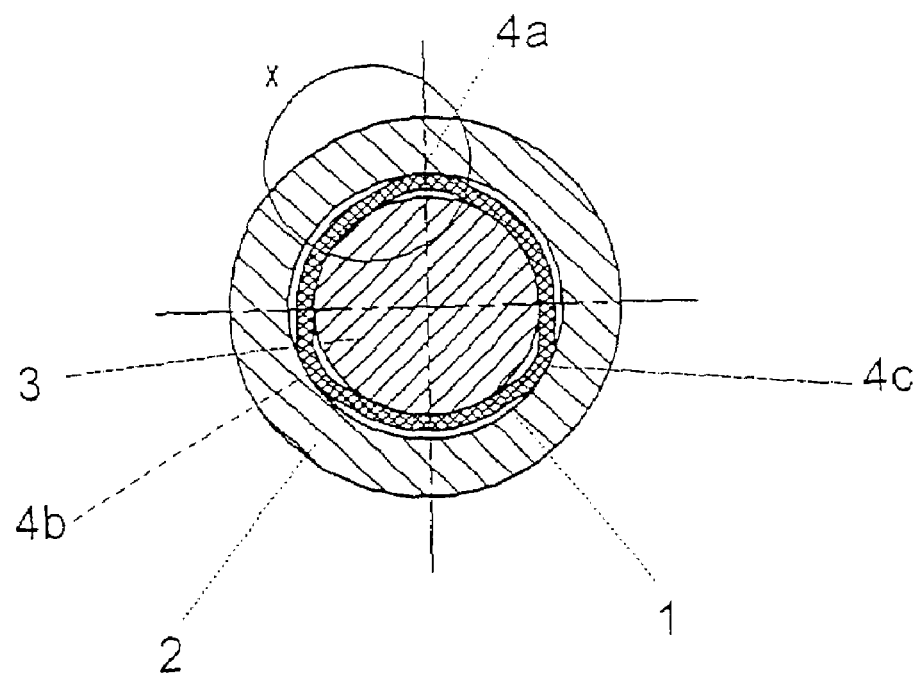
FIG. 2 is a schematic sectional view of a later snapshot of a ball-and-socket joint.

Referring to the drawings in particular, FIGS. 1 and 2 show the states of the injected plastic 1 occurring during the process before and after the solidification. FIG. 1 shows a sectional view of an outer mold 2 with an inner mold 3, the ball of the ball-and-socket joint, between which the injected, liquid plastic 1, preferably the shell material, is located. The outer mold 2 has areas which offer favorable conditions for the adhesion of the injected plastic 1. These areas 4a, 4b, 4c are clearly recognizable in FIG. 2.

The injected plastic 1 is already solidified in FIG. 2 and shrinkage has occurred in some areas because of the properties of the material. Because of the specially prepared areas 4a, 4b, 4c of the outer mold 2, adhesion has been brought about in these areas between the outer mold 2 and the injected plastic 1. Cavities 5, 6 are inevitably formed between the inner mold 3, the ball pivot, and the injected plastic 1 as well as between the outer mold 2 and the injected plastic 1 as a result of the adhesion between the injected plastic 1 and the outer mold 2. Three prepared areas 4a, 4b, 4c for the fixation of the injected plastic 1 can be recognized on the outer mold 2 in FIG. 2. These areas are located at the 12-o'clock position 4a, at the 8-o'clock position 4b and at the 4-o'clock position 4c, i.e., they are offset by 120° in relation to one another.

Figure 3:
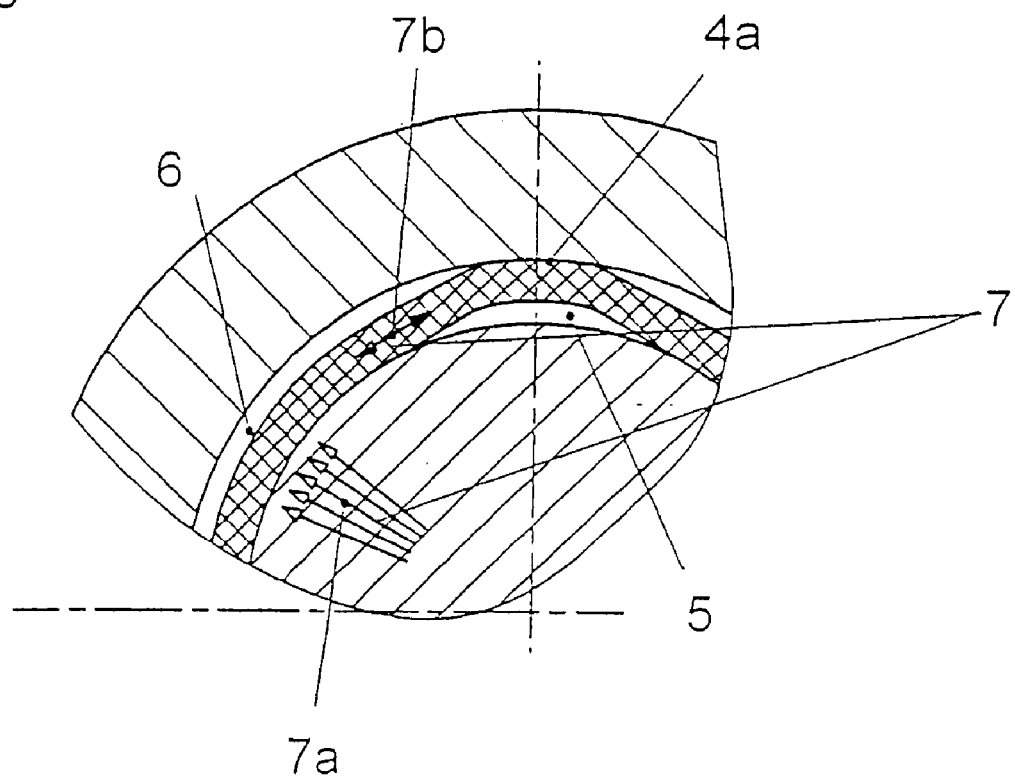
FIG. 3 is a detail of an enlarged view of FIG. 2.

FIG. 3 shows an enlarged view of the 12-o'clock area 4a. Because of the controlled fixation of the injected plastic 1, the deformations occurring as a consequence of the shrinkage behavior of the injected plastic 1 and the stresses 7 associated therewith are qualitatively and quantitatively predictable. Compressive stresses 7a, indicated by corresponding arrows, develop between the inner mold 3 and the injected plastic 1 in the area in which the injected plastic 1 adheres to the inner mold 3 because of the shrinkage. The tensile stress 7b developing in the injected plastic 1 between the fixation area on the outer mold 2 and the press/shrink fit of the inner mold 3 is shown as well. The area of fixation as well as the cavity 5 between the injected plastic 1 and the inner mold 3 and the cavity 6 between the injected plastic 1 and the outer mold 2 can be clearly recognized here as well.

Figure 4:
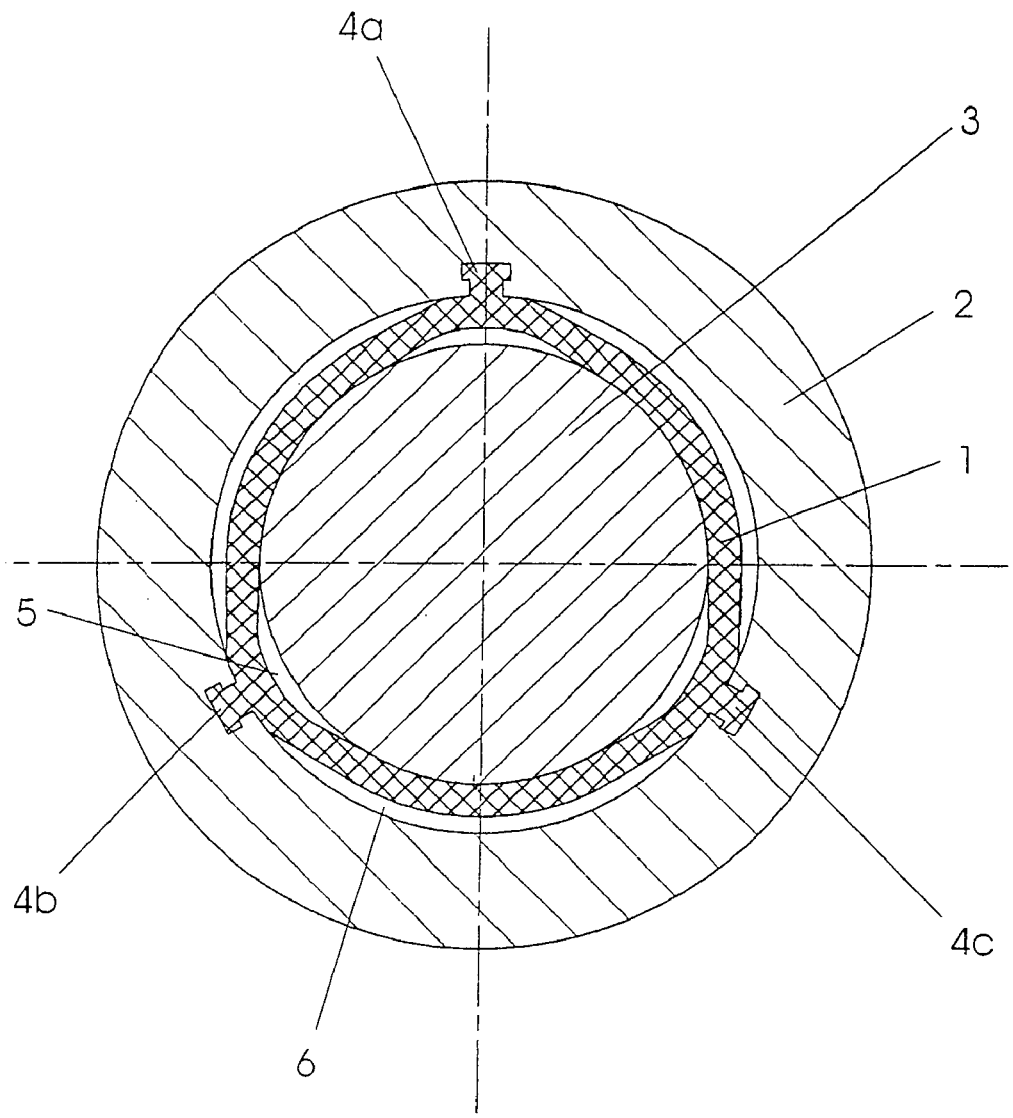
FIG. 4 is another sectional view of a ball-and-socket joint.

FIG. 4 shows, moreover, a sectional view, in which T-shaped grooves 4a, 4b, 4c, into which the liquefied plastic flows during the injection molding, were prepared in the outer mold 2. Since these areas cool down and consequently are cured more rapidly as a consequence of their smaller volume compared with that of the bearing shell, the plastic 1 being cured is fixed in these areas, this fixation thus taking place in a specific and controlled manner, while cavities 5, 6 are formed between these fixations 4a, 4b, 4c.

While specific embodiments of the invention have been shown and described in detail to illustrate the application of the principles of the invention, it will be understood that the invention may be embodied otherwise without departing from such principles.

The invention claimed is:

1. A process for controlling the shrinkage behavior during an original shaping of plastics during the manufacture of a plastic shell, the process comprising the steps of:
    introducing liquified plastic between an inner mold and an outer mold in order for the liquified plastic to cure therein;
    fixing the plastic on said outer mold at plural fixation locations during curing, whereby curing results in shrinkage of the plastic to form inner cavities with each inner cavity being between said inner mold and said plastic in a region of one of said plural fixation locations and to form outer cavities with each outer cavity being between said outer mold and said plastic in a region between plural fixation locations.

2. A process in accordance with claim 1 wherein the fixation of said curing plastic is achieved based on physical or chemical properties of defined areas of said outer mold to provide a partial positive-locking or nonpositive connection with said outer mold and controlled shrinkage of said plastic so that said inner mold is mounted movably in said plastic.

3. A process in accordance with claim 1, wherein said introducing liquified plastic between an inner mold and an outer mold is by an injection molding process.

4. A process in accordance with claim 1, wherein the fixation of said plastic is brought about by bonding.

5. A process in accordance with claim 1, further comprising introducing a lubricant into cavities formed during the solidification of said plastic in the mold.

6. A process in accordance with claim 1, further comprising:
    forming a contact region of contact between the plastic and the inner mold in the area of the outer cavities during curing.

7. A process in accordance with claim 1, further comprising:
    developing a compressive stress between the inner mold and the plastic in said region during curing; and
    developing a tensile stress in the plastic between the fixation locations on the outer mold and contact areas of the inner mold during curing.

8. A process for the manufacture of a plastic shell, the process comprising the steps of:
    introducing liquified plastic between an inner mold and an outer mold in order for the liquified plastic to cure therein;

controlling the shrinkage behavior during curing to provide an original shaping of the plastic by fixing the plastic on said outer mold at plural fixation locations to form plural inner cavities with each inner cavity being between said inner mold and said plastic in a region of one of said plural fixation locations and to form plural outer cavities with each outer cavity being between said outer mold and said plastic in a region between adjacent fixation locations with said inner and outer cavities alternating with each said inner cavity being between outer cavities and each outer cavity being between inner cavities.

9. A device for controlling the shrinkage behavior during the original shaping of plastics for a process including introducing liquified plastic between an inner mold and an outer mold in order for the liquified plastic to cure therein, wherein the plastic is partially fixed on said outer mold during the curing, the device comprising;

a casting mold accommodating at least the outer mold and the inner mold inserted into said casting mold, wherein said liquified plastic to be molded can be introduced between said mold parts; and means for fixing said liquid plastic on said outer mold during curing and resulting shrinkage of the plastic to form inner cavities with each inner cavity being between said inner mold and said plastic in a region of one of said plural fixation locations and to form outer cavities with each outer cavity being between said outer mold and said plastic in a region between plural fixation locations.

10. A device in accordance with claim 9, wherein said means for fixing said plastic comprises T-grooves into which said liquid plastic flows and is fixed on said outer mold as a result after its solidification.

11. A device in accordance with claim 9, wherein said means for fixing said plastic comprises mold zones having partially a primer with high adhesiveness for said plastic to be molded and primer-free areas which have a low adhesiveness for said plastic to be molded.

12. A device in accordance with claim 9, wherein said means for fixing said plastic comprises mold zones which partially have a binder such as an adhesive as well as binder-free areas.

13. A device in accordance with claim 9, wherein said inner mold is the ball of a ball pivot.

14. A ball-and-socket joint formed by the process comprising:

providing a ball-and-socket joint housing;

providing a ball pivot;

introducing liquified plastic between said ball pivot as an inner mold and said joint housing as an outer mold; and at least partially fixing the plastic on said outer mold at plural fixation areas during curing of the plastic to form a bearing shell, said bearing shell being disposed between said ball-and-socket joint housing and said ball pivot with inner cavities formed between the ball pivot and the plastic in a region of respective said fixation areas and outer cavities are formed between said joint housing and the plastic in a region between adjacent fixation areas.

15. A ball-and-socket joint in accordance with claim 14, wherein the fixation of said plastic is brought about by bonding.

16. A ball-and-socket joint in accordance with claim 14, further comprising introducing a lubricant into at least one of said inner cavities formed during the solidification of said plastic in the mold.

17. A ball-and-socket joint in accordance with claim 14, wherein the plastic contacts the inner mold in the area of the outer cavities.

18. A ball-and-socket joint in accordance with claim 17, wherein a compressive stress is developed between the inner mold and the plastic in contact areas in which the plastic contacts the inner mold; and a tensile stress is developed in the plastic between the fixation areas on the outer mold and the contact areas of the inner mold.

19. A ball-and-socket joint in accordance with claim 14, wherein the fixation areas are offset by 120° in relation to one another.

20. A ball-and-socket joint in accordance with claim 14, wherein the fixation areas are T-shaped grooves formed in the housing;

the plastic engages the T-shaped grooves.

* * * * *